(12) United States Patent
Zhao et al.

(10) Patent No.: US 12,072,589 B2
(45) Date of Patent: Aug. 27, 2024

(54) DIMMING PANEL AND MANUFACTURING METHOD THEREFOR, AND DIMMING GLASS AND MANUFACTURING METHOD THEREFOR

(71) Applicants: Beijing BOE Sensor Technology Co., Ltd., Beijing (CN); BOE TECHNOLOGY GROUP CO., LTD., Beijing (CN)

(72) Inventors: Bin Zhao, Beijing (CN); Shuai Xu, Beijing (CN); Chuncheng Che, Beijing (CN)

(73) Assignees: BEIJING BOE SENSOR TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/762,118

(22) PCT Filed: May 10, 2021

(86) PCT No.: PCT/CN2021/092557
§ 371 (c)(1),
(2) Date: Mar. 21, 2022

(87) PCT Pub. No.: WO2022/236521
PCT Pub. Date: Nov. 17, 2022

(65) Prior Publication Data
US 2024/0045285 A1    Feb. 8, 2024

(51) Int. Cl.
*G02F 1/1347* (2006.01)
*G02F 1/1335* (2006.01)
*G02F 1/1339* (2006.01)

(52) U.S. Cl.
CPC ...... *G02F 1/1347* (2013.01); *G02F 1/133601* (2021.01); *G02F 1/1339* (2013.01)

(58) Field of Classification Search
CPC ............ G02F 1/1333; G02F 1/133377; G02F 1/133351; G02F 1/1335; G02F 1/1337;
(Continued)

(56) References Cited

U.S. PATENT DOCUMENTS

| 2003/0118922 | A1  | 6/2003 | Hayashi et al. |
| 2012/0188493 | A1* | 7/2012 | Sato ................. G02F 1/133351 445/24 |
| 2017/0075163 | A1* | 3/2017 | Galstian ............. G02F 1/13394 |

FOREIGN PATENT DOCUMENTS

| CN | 103499897 A | 1/2014 |
| CN | 106537236 A | 3/2017 |

(Continued)

OTHER PUBLICATIONS

Machine translation of CN 103499897 A (Year: 2014).*

*Primary Examiner* — Xuemei Zheng
(74) *Attorney, Agent, or Firm* — WHDA, LLP

(57) ABSTRACT

The present disclosure provides a dimming panel and a manufacturing method therefor, and a dimming glass and a manufacturing method therefor. The dimming panel includes at least one dimming module; the dimming module includes a first substrate and a second substrate disposed oppositely, and a dimming layer disposed between the first substrate and the second substrate; the dimming layer includes a region to be cut and a dimming region connected to the region to be cut, the region to be cut includes at least one definition part, the dimming region includes a plurality of dimming parts, the definition part is disposed between adjacent dimming parts, and configured to be capable of being cut to segment the adjacent dimming parts, and the dimming part is configured to control transmittances of lights under an action of an electric field.

17 Claims, 5 Drawing Sheets

(58) Field of Classification Search
CPC ............... G02F 1/1339; G02F 1/13394; G02F 1/13396; G02F 1/13398; G02F 1/1341; G02F 1/134309; G02F 1/13415; G02F 1/1347; G02F 1/133601
See application file for complete search history.

(56) References Cited

FOREIGN PATENT DOCUMENTS

| | | | |
|---|---|---|---|
| CN | 111965905 | A | 11/2020 |
| CN | 112327543 | A | 2/2021 |
| JP | 2003-302759 | A | 10/2003 |

\* cited by examiner

DIMMING PANEL AND MANUFACTURING METHOD THEREFOR, AND DIMMING GLASS AND MANUFACTURING METHOD THEREFOR

TECHNICAL FIELD

The present disclosure relates to the technical field of display glass, and in particularly relates to a dimming panel and a manufacturing method therefor, and a dimming glass and a manufacturing method therefor.

BACKGROUND

With the demand for smart window products gradually increasing, according to different application scenarios, products with different sizes need to be customized. Even if it is applied to a same terminal, if placement positions by designed are different, required sizes of the products will be different. The overall market presents a product form with a small quantity required for a single size, but a huge variety of sizes required. The current production method has low production efficiency and high cost, which cannot meet the market demand.

SUMMARY

The embodiments of the present disclosure provide a dimming panel and a manufacturing method therefor, and a dimming glass and a manufacturing method therefor, the dimming panel is capable for being cut into a plurality of products with any preset shape, so that the production efficiency can be improved by mass-producing the dimming panel, thereby greatly reducing the cost.

In order to achieve the above purpose, the embodiments of the present disclosure use the following technical solutions:

in one aspect, a dimming panel is provided, wherein the dimming panel comprises at least one dimming module; the dimming module comprises a first substrate and a second substrate disposed oppositely, and a dimming layer disposed between the first substrate and the second substrate; and the dimming layer comprises a region to be cut and a dimming region connected to the region to be cut, the region to be cut comprises at least one definition part, the dimming region comprises a plurality of dimming parts, the definition part is disposed between adjacent dimming parts, and configured to be capable of being cut to segment the adjacent dimming parts, and the dimming part is configured to control transmittances of lights under an action of an electric field.

Optionally, the definition part is configured to be obtained after deforming a deformable structure.

Optionally, the deformable structure comprises an expandable structure.

Optionally, the expandable structure comprises an inner core layer and a cladding layer surrounding the inner core layer, a material of the inner core layer comprises a foaming agent, and a material of the cladding layer comprises a thermoplastic polymer; the definition part is configured to be obtained after the expandable structure is thermally expanded and cured.

Optionally, the foaming agent comprises hydrocarbons, and the thermoplastic polymer comprises anyone of: a mixture of AN/VDC and MMA, a mixture of AN/VDC and MA, a mixture of AN/VDC and MAN.

Optionally, a shape of the expandable structure is a spherical shape.

Optionally, a diameter range of the expandable structure is 4 μm-20 μm.

Optionally, the dimming part comprises a dye liquid crystal layer, and the expandable structure doped in the dye liquid crystal layer.

Optionally, the expandable structure is further configured to be used as a spacer ball.

Optionally, a diameter of the expandable structure is equal to a thickness of the dimming layer along a direction perpendicular to a plane where the first substrate is located.

Optionally, the dimming module further comprises a first alignment film and a second alignment film, the first alignment film is disposed at a side of the first substrate close to the dimming layer, and the second alignment film is disposed at a side of the second substrate close to the dimming layer;

the first alignment film comprises an illuminated first alignment part, an orthographic projection of the illuminated first alignment part on the first substrate overlaps with an orthographic projection of the definition part on the first substrate; the second alignment film comprises an illuminated second alignment part, an orthographic projection of the illuminated second alignment part on the second substrate overlaps with an orthographic projection of the definition part on the second substrate; and the expandable structure comprises a first alignment part before illumination and a second alignment part before illumination; the definition part is configured to be obtained after the first alignment part before illumination and the second alignment part before illumination are both expanded by illumination, undergo cross-linking reaction and are cured.

Optionally, the first alignment part before illumination and the second alignment part before illumination both comprise a polyimide and a first coupling agent.

Optionally, a material of the deformable structure comprises a liquid crystal and a second coupling agent, and the definition part is configured to be obtained after the deformable structure undergoes cross-linking reaction by being heated or illuminated and is cured.

Optionally, a material of the definition part comprises a frame sealant.

Optionally, the region to be cut comprises a plurality of definition parts, the plurality of definition parts are configured to divide the dimming region into the plurality of dimming parts with different sizes.

In another aspect, a dimming glass is provided, and the dimming glass comprises at least one cut dimming panel, the cut dimming panel is configured to be obtained after cutting the above-mentioned dimming panel along the region to be cut.

Optionally, the dimming glass comprises a plurality of cut dimming panels, the plurality of cut dimming panels are spliced with each other.

In another aspect, a manufacturing method of the above-mentioned dimming panel is provided, wherein the method comprises:

forming a standard dimming panel; the standard dimming panel comprises at least one dimming module; the dimming module comprises a first substrate and a second substrate disposed oppositely, and a dimming layer disposed between the first substrate and the second substrate; the dimming layer comprises an expandable structure; the expandable structure comprises an inner core layer and a cladding layer surrounding the inner core layer, a material of the inner core layer comprises a foaming agent, and a material of the cladding layer comprises a thermoplastic polymer; and heating a designated region of the dimming layer, to make the expandable structure located in the designated region thermally expanded and cured, to form the above-mentioned dimming panel.

Optionally, the foaming agent comprises hydrocarbons, and the thermoplastic polymer comprises anyone of: a mixture of AN/VDC and MMA, a mixture of AN/VDC and MA, a mixture of AN/VDC and MAN.

In another aspect, a manufacturing method of the above-mentioned dimming glass is provided, wherein the method comprises:

cutting the above-mentioned dimming panel along the region to be cut, to obtain at least one cut dimming panel.

Optionally, after cutting the above-mentioned dimming panel along the region to be cut, to obtain at least one cut dimming panel, the method further comprises:

splicing the cut dimming panels.

The above description is merely a summary of the technical solutions of the present disclosure. In order to more clearly know the elements of the present disclosure to enable the implementation according to the contents of the description, and in order to make the above and other purposes, features, and advantages of the present disclosure more apparent and understandable, the particular embodiments of the present disclosure are provided below.

BRIEF DESCRIPTION OF THE DRAWINGS

In order to more clearly illustrate the technical solutions of the embodiments of the present disclosure or the prior art, the figures that are required to describe the embodiments or the prior art will be briefly introduced below. Apparently, the figures that are described below are embodiments of the present disclosure, and a person skilled in the art can obtain other figures according to these figures without paying creative work.

DETAILED DESCRIPTION OF THE EMBODIMENTS

In order to make the objects, the features, and the advantages of the embodiments of the present disclosure clearer, the embodiments of the present disclosure will be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

In the embodiments of the present disclosure, words such as "first" and "second" are used to distinguish the same items or similar items with basically the same functions and effects, which are only for the purpose of clearly describing the technical solutions of the embodiments of the present disclosure, and should not be understood to indicate or imply relative importance or to imply the quantity of technical features indicated. In addition, "plurality" means two or more, and "at least one" means one or more, unless expressly defined otherwise.

Figure 1:
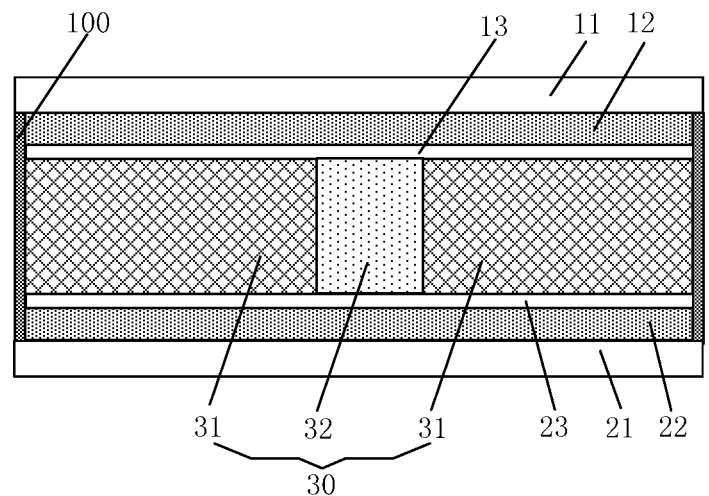
FIG. 1 schematically illustrates a structural schematic diagram of a dimming panel with a definition part.
Figure 2:
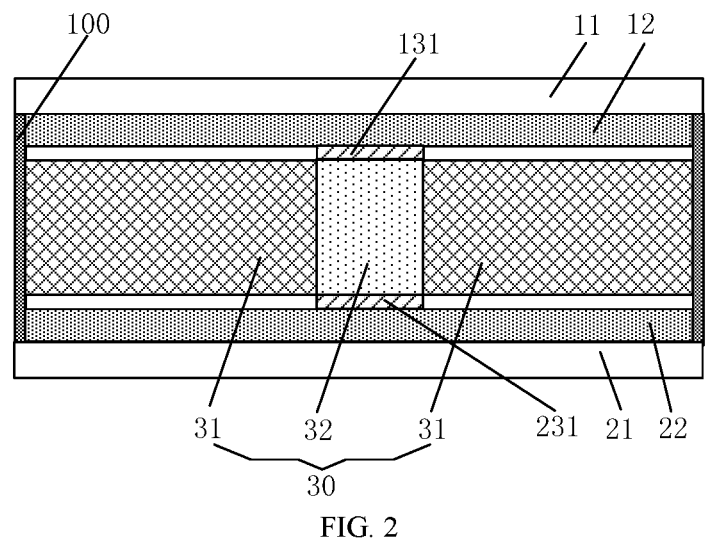
FIG. 2 schematically illustrates a structural schematic diagram of another dimming panel with a definition part.

The embodiment of the present disclosure provides a dimming panel, and the dimming panel includes at least one dimming module; referring to FIG. 1 and FIG. 2, the dimming module includes a first substrate 11 and a second substrate 21 disposed oppositely, and a dimming layer 30 disposed between the first substrate 11 and the second substrate 21.

Figure 3:
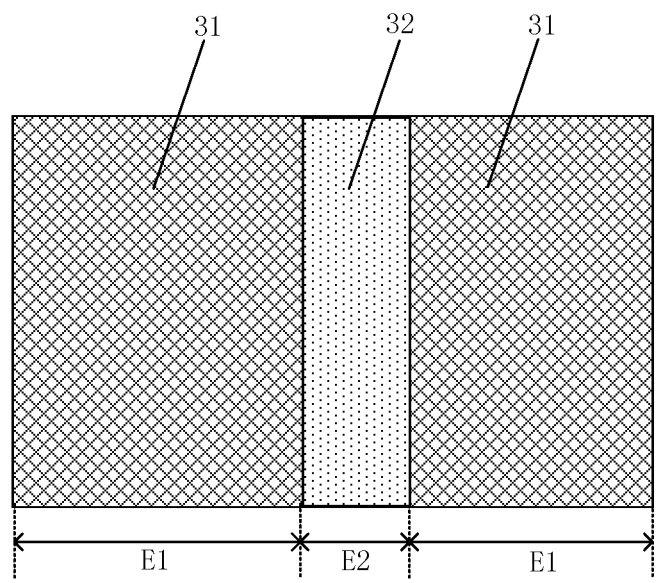
FIG. 3 schematically illustrates a structural schematic diagram of a dimming layer.

Referring to FIG. 3, the dimming layer includes a region to be cut E2 and a dimming region E1 connected to the region to be cut E2, the region to be cut E2 includes at least one definition part 32, the dimming region E1 includes a plurality of dimming parts 31, the definition part 32 is disposed between adjacent dimming parts 31, and configured to be capable of being cut to segment the adjacent dimming parts, and the dimming part 31 is configured to control transmittances of lights under an action of an electric field.

The quantity of the dimming modules included in the above-mentioned dimming panel is not limited. For example, the dimming panel may include one dimming module; or, the dimming panel may include a plurality of dimming modules, and a plurality of dimming modules are disposed in a form of lamination. FIG. 1 and FIG. 2 illustrate that the dimming panel includes one dimming module as an example. FIG. 3 is a top view schematic diagram of the dimming layer in FIG. 1 and FIG. 2.

The first substrate and the second substrate of the above-mentioned dimming module may be rigid substrates, and the materials thereof may be rigid materials such as glass and quartz. Alternatively, the first substrate and the second substrate may also be flexible substrates, and their materials may be flexible materials such as polyethylene glycol terephthalate (PET), triacetate cellulose (TAC), and polyimide (PI).

In the above-mentioned dimming layer, the division of the region to be cut and the dimming region is not limited, and may be determined according to the actual required product shape. For example, referring to FIG. 3, the region to be cut E2 is set in the middle, and the dimming region is divided into two regions E1, so that rectangular dimming panels with two sizes may be formed after the dimming panel is cut along the definition part.

The formation method and material of the above-mentioned definition part of the region to be cut are not limited. For example, the definition part may be obtained after deforming a deformable structure; or, the definition part may be formed by using a frame sealant.

The structure and material of the dimming part of the above-mentioned dimming region are not limited. For example, the dimming part may include a dye liquid crystal layer, and the dye liquid crystal layer may include liquid crystal molecules, dye molecules (e.g., dichroic dye molecules), and chiral additives. The principle of dimming is illustrated by taking initial orientations of negative liquid crystal molecules and dichroic dye molecules being the direction perpendicular to the first substrate as an example. When an electric field is applied, the liquid crystal molecules and the dichroic dye molecules are deflected, and the absorption of light by the dichroic dye molecules is used to realize that the light cannot penetrate the dimming panel, and the dimming panel presents a dark state. When no electric field is applied, the liquid crystal molecules and the dichroic dye molecules are not deflected, the light can penetrate the dimming panel, and the dimming panel presents a bright state. Certainly, the above-mentioned liquid crystal molecules may also be positive liquid crystal molecules, and the corresponding dimming principle may be obtained with reference to the above-mentioned principle and the related art, which will not be repeated here.

In order to determine the initial orientation of the liquid crystal molecules, in one or more embodiments, as shown in FIG. 1, the dimming module may further include a first alignment film 13 and a second alignment layer 23, and the first alignment film 13 is disposed at a side of the first substrate 11 close to the dimming layer 30, and the second alignment layer 23 is disposed at a side of the second substrate 21 close to the dimming layer 30. Further optionally, as shown in FIG. 1, the above-mentioned dimming module may further include a first electrode layer 12 and a second electrode layer 22. The first electrode layer 12 is disposed at a side of the first alignment film 13 away from the dimming layer 30, and the second electrode layer 12 is disposed at a side of the second alignment layer 23 away from the dimming layer 30, and an electric field may be formed between the first electrode layer 12 and the second electrode layer 22 to control the dimming part. Referring to FIG. 1 and FIG. 2, the dimming panel may further include an encapsulation structure 100 to prevent leakage of the dimming layer and improve encapsulation effect. The encapsulation structure 100 may be fabricated by using a frame sealant.

In the related art, the production method of a single size product is used, which has low production efficiency and high cost. However, the dimming panel provided by the embodiment of the present disclosure may be cut into a plurality of products with any preset shape, so as to meet the user's requirements for products with different sizes, and the production efficiency may be improved by mass-producing the dimming panel, thereby greatly reducing costs.

Optionally, in order to reduce changes to the original process and facilitate implementation, the definition part is configured to be obtained after deforming the deformable structure. The specific structure and deformation method of the deformable structure are not limited here. For example, the deformable structure may be deformed by physical means such as an expansion to form the definition part; or may also be deformed by chemical means such as a cross-linking reaction to form the definition part.

Further optionally, the deformable structure includes an expandable structure. The specific structure and material of the expandable structure are not limited here.

Figure 4:
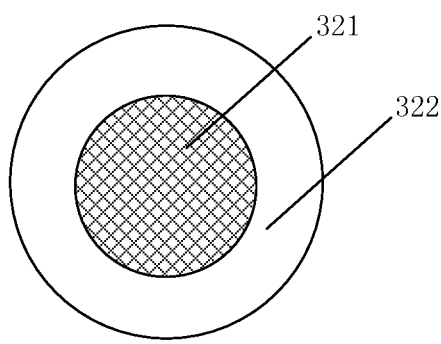
FIG. 4 schematically illustrates a structural schematic diagram of an expandable structure.

In order to reduce the difficulty of fabrication and facilitate production, optionally, as shown in FIG. 4, the expandable structure includes an inner core layer 321 and a cladding layer 322 surrounding the inner core layer 321, the material of the inner core layer includes a foaming agent, and the material of the cladding layer includes a thermoplastic polymer; the definition part is configured to be obtained after the expandable structure is thermally expanded and cured.

The shape of the expandable structure is not limited here. For example, the shape of the expandable structure may be a spherical shape, an ellipsoid shape, a cube shape, and so on. FIG. 4 is a cross-sectional view of a spherical expandable structure.

Figures 5A, 5B:
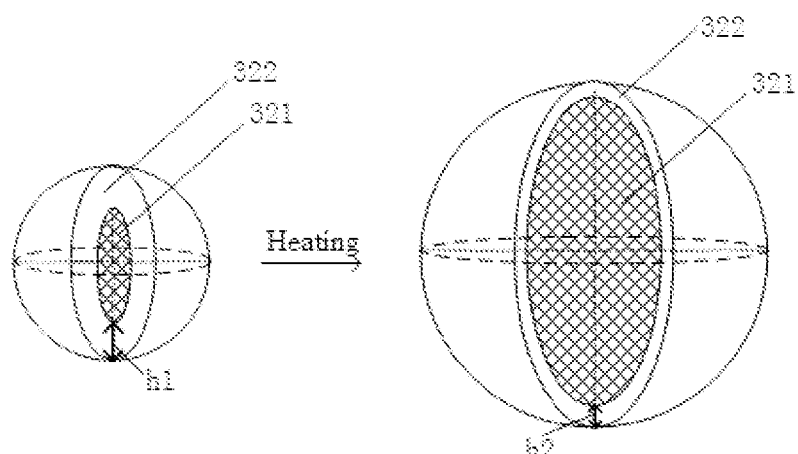
FIG. 5a schematically illustrates a structural schematic diagram of an expandable structure before expansion, and FIG. 5b schematically illustrates a structural schematic diagram of the expandable structure shown in FIG. 5a after expansion.

By taking a spherical solid expandable structure as an example, its expansion principle is described below. Referring to FIGS. 5a and 5b, after the expandable structure is heated to a certain temperature, the foaming agent of the inner core layer 321 vaporizes to generate an internal pressure, and the cladding layer 322 is softened; driven by the internal pressure, the expandable structure shown in FIG. 5a expands, and a thickness of the cladding layer 322 decreases from h1 shown in FIGS. 5a to h2 shown in FIG. 5b, until the internal pressure and an external pressure are balanced, and finally the structure with larger volume shown in FIG. 5b is formed. In addition, the expanded structure may remain an expansion state after cooling and solidification.

It should be noted that the expansion rate of the expandable structure is positively correlated with the content of the foaming agent, that is, the more the content of foaming agent, the greater the expansion rate. The size of the expandable structure may affect the content of the foaming agent.

The larger the size of the expandable structure, the more the content of the foaming agent. Therefore, the expansion rate of the expandable structure may be controlled by adjusting the size of the expandable structure.

Optionally, in order to reduce costs, the foaming agent includes hydrocarbons, and the thermoplastic polymer includes anyone of: a mixture of AN/VDC and MMA, a mixture of AN/VDC and MA, a mixture of AN/VDC and MAN.

The higher the boiling point of the foaming agent, the higher the foaming temperature; in order to control the heating temperature, the above-mentioned hydrocarbons may be low-boiling hydrocarbons, for example, the hydrocarbons may be any one of an isopentane, a n-octane, and an isooctane.

The Chinese name of the above AN/VDC is bingxijingpianlvyixi (the unicodes of the characters are 00004E19, 000070EF, 00008148, 0000002D, 0000504F, 00006C2F, 00004E59, 000070EF), which can provide sealing performance and rigidity. The Chinese name of the above-mentioned MMA is jiajibingxisuanjiazhi (the unicodes of the characters are 00007532, 000057FA, 00004E19, 000070EF, 00009178, 00007532, 0000916F), the Chinese name of MA is bingxisuanjiazhi (the unicodes of the characters are 00004E19, 000070EF, 00009178, 00007532, 0000916F), and the Chinese name of MAN is jiajibingxijing (the unicodes of the characters are 00007532, 000057FA, 00004E19, 000070EF, 00008148); MMA, MA and MAN can all provide thermoplastic. The mixture of AN/VDC and MMA can be obtained after physical mixing AN/VDC and MMA; similarly, the mixture of AN/VDC and MA can be obtained after physical mixing AN/VDC and MA; the mixture of AN/VDC and MAN can be obtained after physical mixing AN/VDC and MAN.

It should be noted that the above-mentioned thermoplastic polymer does not begin to soften until the heating temperature is higher than its glass-transition temperature Tg. The higher the glass-transition temperature of the thermoplastic polymer, the higher the foaming initiation temperature. To increase the foaming temperature, a cross-linking agent may be added to the material of the cladding layer. Considering the process temperature in the existing process, if the glass-transition temperature of the thermoplastic polymer is too low, it may soften in advance in the process of other film layers, which is not conducive to the subsequent formation of the definition part; if the glass-transition temperature of the thermoplastic polymer is too high, higher temperature is required to heat to soften it, but too high a heating temperature may affect the quality of the formed film. Therefore, a thermoplastic polymer with a suitable glass-transition temperature may be selected according to the temperature of the process. For example, if the above dimming panel is a flexible dimming panel, the glass-transition temperature Tg of the thermoplastic polymer satisfies: 100° C.≤Tg≤130° C.; if the above dimming panel is a rigid dimming panel, the glass-transition temperature Tg of the thermoplastic polymer satisfies: 100° C.≤Tg≤230° C.

Optionally, in order to obtain a better expansion effect to form a better definition part, the shape of the above expandable structure is a spherical shape. The diameter of the spherical expandable structure is not limited here, which can be determined according to the cell thickness (i.e., the distance between the first substrate and the second substrate) of the dimming panel. Further optionally, the diameter range of the expandable structure is 4 μm-20 μm. For example, the diameter of the expandable structure may be 4 μm, 8 μm, 12 μm, 16 μm, 20 μm and so on.

Optionally, the dimming part includes a dye liquid crystal layer, and the expandable structure doped in the dye liquid crystal layer. That is, the expandable structure is further configured to be used as a spacer ball, to support a liquid crystal cell, thereby replacing an original support structure. The specific structure of the dye liquid crystal layer is not limited, and reference may be made to the foregoing description, which will not be repeated here.

Figure 6:
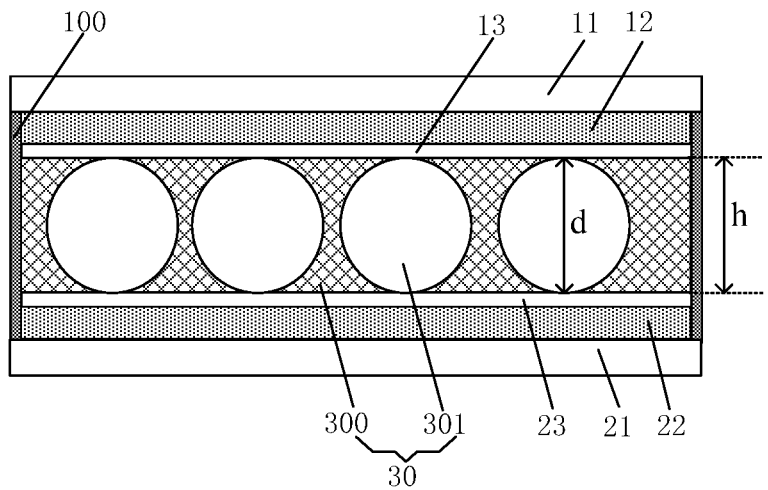
FIG. 6 schematically illustrates a structural schematic diagram of a dimming panel before the expandable structure is heated.

Optionally, in order to provide better support, referring to FIG. 6, the diameter d of the expandable structure 301 is equal to a thickness h of the dimming layer 30 along a direction perpendicular to a plane where the first substrate 11 is located.

It should be noted that the structure shown in FIG. 6 is a structural schematic diagram of a dimming panel without heating the expandable structure 301. In FIG. 6, the dimming layer 30 includes the dye liquid crystal layer 300 and the expandable structure 301 doped in the dye liquid crystal layer 300. After heating the expandable structure in the designated region, a dimming panel with a definition part is formed, and the part of the dimming layer other than the designated region is the dimming part.

In one or more embodiments, the dimming module further includes a first alignment film and a second alignment film, the first alignment film is disposed at a side of the first substrate close to the dimming layer, and the second alignment film is disposed at a side of the second substrate close to the dimming layer.

Referring to FIG. 2, the first alignment film includes an illuminated first alignment part 131, an orthographic projection of the illuminated first alignment part 131 on the first substrate 11 overlaps with an orthographic projection of the definition part 32 on the first substrate 11; the second alignment film includes an illuminated second alignment part 231, an orthographic projection of the illuminated second alignment part 231 on the second substrate 21 overlaps with an orthographic projection of the definition part 131 on the second substrate 21.

The above-mentioned content that the orthographic projection of the illuminated first alignment part on the first substrate overlaps with the orthographic projection of the definition part on the first substrate 11 may include: the orthographic projection of the illuminated first alignment part on the first substrate partly overlaps with the orthographic projection of the definition part on the first substrate, or the orthographic projection of the illuminated first alignment part on the first substrate entirely overlaps with the orthographic projection of the definition part on the first substrate, and FIG. 2 shows the latter as an example. The above-mentioned content that the orthographic projection of the illuminated second alignment part on the second substrate overlaps with the orthographic projection of the definition part on the second substrate may include: the orthographic projection of the illuminated second alignment part on the second substrate partly overlaps with the orthographic projection of the definition part on the second substrate, or the orthographic projection of the illuminated second alignment part on the second substrate entirely overlaps with the orthographic projection of the definition part on the second substrate, and FIG. 2 shows the latter as an example.

The expandable structure includes a first alignment part before illumination and a second alignment part before illumination; the definition part is configured to be obtained after the first alignment part before illumination and the second alignment part before illumination are both expanded by illumination, undergo cross-linking reaction and are cured.

Figure 7:
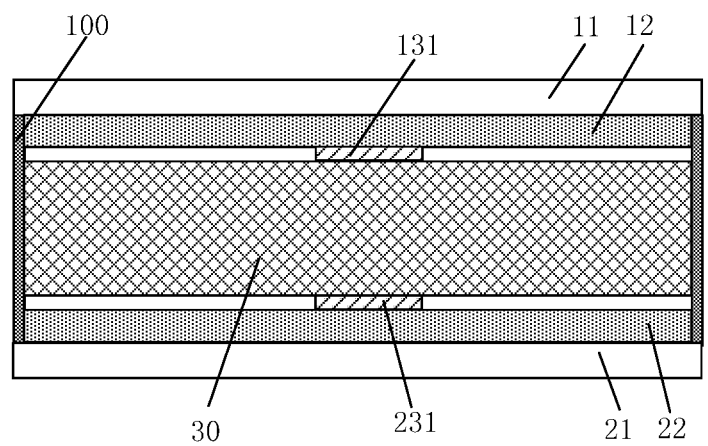
FIG. 7 schematically illustrates a structural schematic diagram of a dimming panel before the expandable structure is illuminated.

FIG. 7 is a dimming panel before illumination, and FIG. 2 is an illuminated dimming panel, combined with FIG. 7 and FIG. 2, the first alignment part 131 before illumination and the second alignment part 231 before illumination in FIG. 7 are illuminated, and the two are connected together after expansion, and a cross-linking reaction occurs. After being cured, the definition part 32 shown in FIG. 2 is obtained.

The materials of the first alignment part before illumination and the second alignment part before illumination are not limited. For example, a coupling agent can be added to the original material (for example: polyimide), so that the structure expands after illumination, then the cross-linking reaction occurs, and the definition part is formed after being cured to separate the dimming part. Taking the materials of the first alignment part before illumination and the second alignment part before illumination including oxa ketone (also known as coumarin) as an example to illustrate the cross-linking reaction, the coumarin may undergo cross-linking reaction after illumination, to form a corresponding photochemical structure.

The cross-linking reaction formula is as follows:

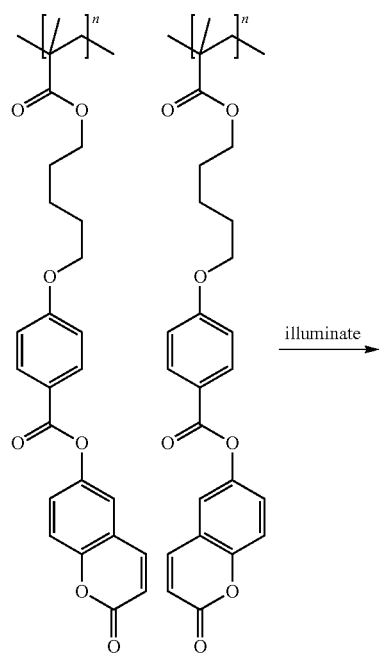

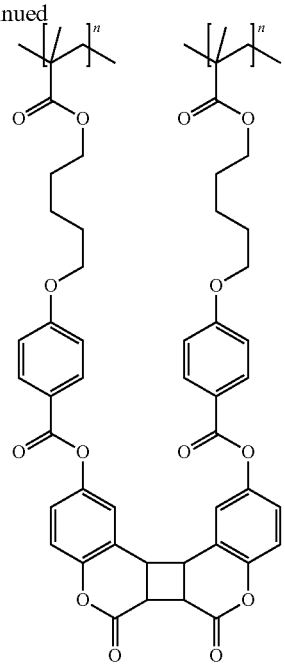

Further optionally, in order to reduce the difficulty of manufacture, the first alignment part before illumination and the second alignment part before illumination both include a polyimide and a first coupling agent. The specific structure of the coupling agent is not limited here.

In one or more embodiments, the material of the deformable structure may further include a liquid crystal and a second coupling agent, and the definition part is configured to be obtained after the deformable structure undergoes cross-linking reaction by being heated or illuminated and is cured.

The specific structure of the second coupling agent is not limited. The structures of the second coupling agent and the above-mentioned first coupling agent may be the same, or may be different; the specific needs are determined according to actual requirements.

In one or more embodiments, the material of the definition part may further include a frame sealant. For example, a frame sealant may be coated on the first substrate or the second substrate to form the definition part, thereby separating the dimming part.

Optionally, the region to be cut includes a plurality of definition parts, the plurality of definition parts are configured to divide the dimming region into the plurality of dimming parts with different sizes.

Figure 8:
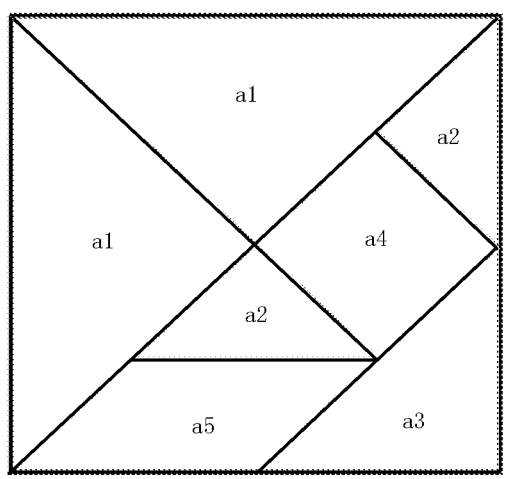
FIG. 8 schematically illustrates a distribution schematic diagram of a definition part.
Figure 9A:
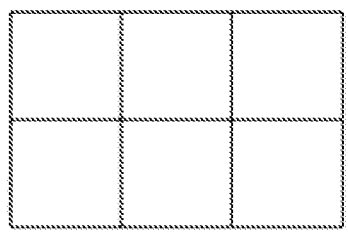
FIG. 9a, FIG. 9b, and FIG. 9c respectively schematically illustrates a structural schematic diagram of a spliced product.
Figure 9B:
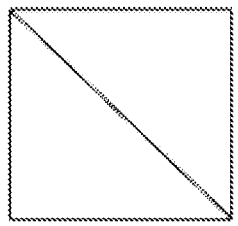
Figure 9C:

The setting position of the above definition part needs to be determined according to the actual requirements. For example, as shown in FIG. 8, the plurality of definition parts divide the dimming region into seven dimming parts (similar to a tangram structure), and the seven dimming parts include two large-sized triangular dimming part a1, two small-sized triangle dimming part a2, one medium-sized triangle dimming part a3, one square dimming part a4 and one parallelogram dimming part a5. Subsequently, the dimming panel may be cut along the region to be cut to obtain cut dimming panels with different sizes and different shapes; at the same time, the cut dimming panels may be spliced to form products with more shapes and sizes (for example: the splicing products shown in FIGS. 9a, 9b and 9c) to meet needs of users. Then, by mass-producing the above dimming panel, the production efficiency may be greatly improved and the production cost may be reduced.

The embodiment of the present disclosure further provides a dimming glass, which includes at least one cut dimming panel, and the cut dimming panel is configured to be obtained after cutting the above-mentioned dimming panel along the region to be cut.

The above-mentioned dimming glass may also include two glass substrates disposed oppositely, and the cut dimming panel may be disposed between the two glass substrates.

The above-mentioned dimming glass may be applied to car windows, high-speed railway windows, office buildings, office windows, building curtain walls, residential bay windows and any other smart windows that need dimming, and has a wide range of applications.

Optionally, the dimming glass includes a plurality of cut dimming panels, the plurality of cut dimming panels are spliced with each other.

By splicing, dimming panels with more shapes and sizes may be further formed to meet the needs of users; at the same time, the cut dimming panels may be used to the greatest extent to further improve the production efficiency and reduce production costs.

The embodiment of the present disclosure further provides a manufacturing method of the dimming panel, in which the definition part is configured to be obtained after the expandable structure is thermally expanded and cured.

The method includes:

S01, forming a standard dimming panel; referring to FIG. 6, the standard dimming panel includes at least one dimming module; the dimming module includes a first substrate 11 and a second substrate 21 disposed oppositely, and a dimming layer 30 disposed between the first substrate 11 and the second substrate 21; the dimming layer 30 includes an expandable structure 301, referring to FIG. 4, the expandable structure includes an inner core layer 321 and a cladding layer 322 surrounding the inner core layer 321, a material of the inner core layer includes a foaming agent, and a material of the cladding layer includes a thermoplastic polymer.

The above-mentioned specific steps for forming the standard dimming panel are not limited. For example, the first substrate and the second substrate may be formed first, and then the dimming layer may be formed; or, other forming methods may also be used. For details, reference may be made to the related art, which will not be repeated here.

Referring to FIG. 4, the above-mentioned dimming layer 30 may further include a dye liquid crystal layer 300, and the expandable structure 301 may be doped in the dye liquid crystal layer 300. The higher the doping density of the expandable structure, the more uniform the doping in the dimming layer, which is more conducive to the subsequent formation of the definition part at any position. For example, the density of the expandable structure may be 30*30/cm 2.

For the relevant description of the above expandable structure, reference may be made to the foregoing embodiments, which will not be repeated here.

Figure 10A:
FIG. 10a schematically illustrates a structural schematic diagram of a standard dimming panel, FIG. 10b and FIG. 10c respectively schematically a distribution schematic diagram of a designated region.

The shape and size of the above standard dimming panel are not limited and may be determined according to the actual production line. For example, the standard dimming panel may be the rectangle as shown in FIG. 10a.

S02, heating a designated region of the dimming layer, to make the expandable structure located in the designated region thermally expanded and cured, to form the above dimming panel with the definition part.

Figure 10B:
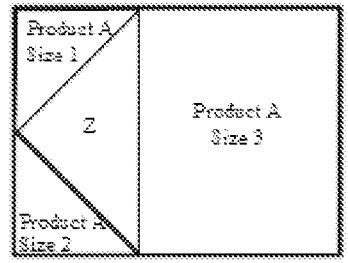
Figure 10C:
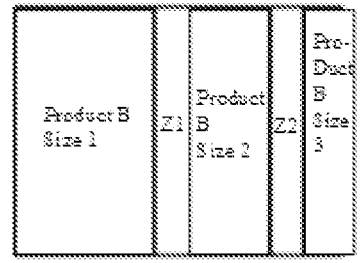

The above designated region may be determined according to the product size and shape required by the user. For example, if the user requires a circular dimming panel, the designated region may include a toroidal region. Then, heating the toroidal region may form an annular definition part; after the dimming panel is subsequently cut along the definition part, the circular dimming panel required by the user can be obtained. Certainly, the designated region may also include regions with other shapes, which will not be listed one by one here. Illustratively, referring to FIG. 10b, after heating the designated region Z, a triangular definition part may be formed, and after subsequent cutting along the definition part, three sizes of a product A shown in FIG. 10b may be obtained. Referring to FIG. 10c, after heating the designated regions Z1 and Z2, a strip-shaped definition part may be formed, and after subsequent cutting along the definition part, three sizes of a product B as shown in FIG. 10c may be obtained.

It should be noted that the designated region of the dimming layer in the above standard dimming panel may form the definition part after heating; then the designated region of the dimming layer in the standard dimming panel corresponds to the region to be cut of the dimming panel with the definition part, and the regions outside the designated region of the dimming layer in the standard dimming panel corresponds to the dimming region of the dimming panel with the definition part.

Figure 11A:
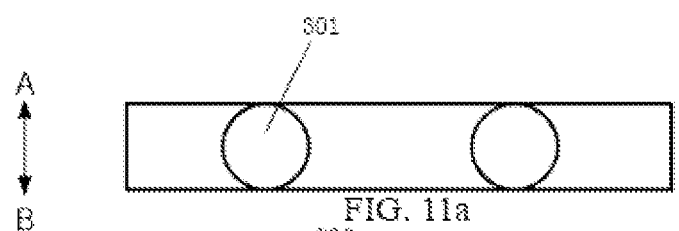
FIG. 11a schematically illustrates a structural schematic diagram of an expandable structure before expansion, and FIG. 11b schematically illustrates a structural schematic diagram of the expandable structure shown in FIG. 11a after expansion.
Figure 11B:
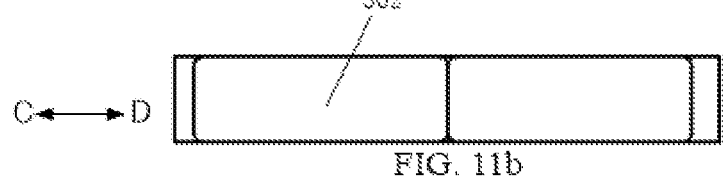
Figures 12A, 12B:
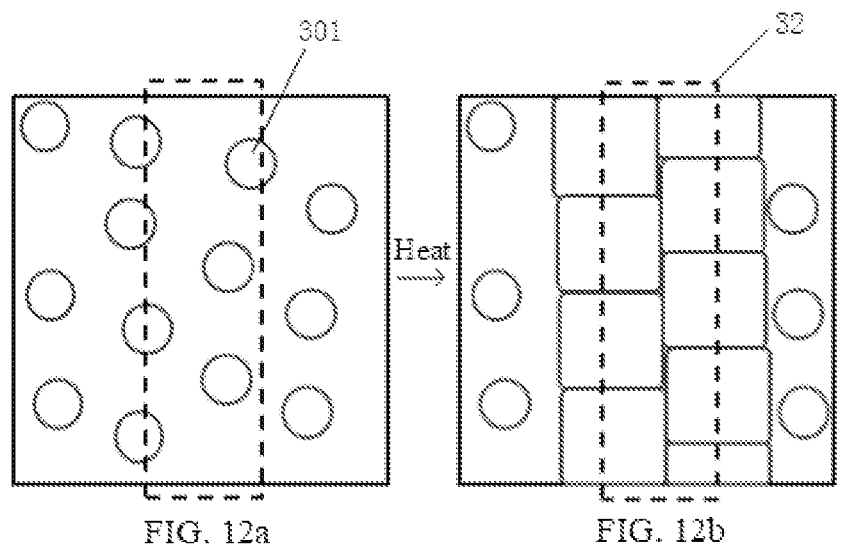
FIG. 12a schematically illustrates a structural schematic diagram of another expandable structure before expansion, and FIG. 12b schematically illustrates a structural schematic diagram of the plurality of expandable structures shown in FIG. 12a after expansion.

The formation process of the definition part is described below by taking the dimming layer also including the dye liquid crystal layer as an example. Since the dye liquid crystal cell may provide a limit in the direction of the cell thickness (that is, the longitudinal direction AB direction shown in FIG. 11a), the expansion direction of the expandable structure is the lateral direction CD direction shown in FIG. 11b, the CD direction is perpendicular to the AB direction. The expandable structure 301 shown in FIG. 11a is expanded to obtain the structure 302 shown in FIG. 11b. Referring to FIGS. 12a and 12b, a plurality of expandable structures 301 in FIG. 12a may be filled laterally after being heated and expanded, and remain the expanded state after being cured, finally forming the definition part 32 as shown in FIG. 12b (equivalent to forming a new boundary).

By performing steps S01 and S02, a dimming panel with a definition part of any shape may be obtained, and the panel is subsequently cut along the definition part to obtain products with any shape and different sizes; at the same time, by mass-producing the standard dimming panel in step S01, which can greatly improve the production efficiency and reduce the production costs.

Optionally, in order to reduce costs, the foaming agent includes hydrocarbons, and the thermoplastic polymer includes anyone of: a mixture of AN/VDC and MMA, a mixture of AN/VDC and MA, a mixture of AN/VDC and MAN.

The higher the boiling point of the foaming agent, the higher the foaming temperature; in order to control the heating temperature, the above-mentioned hydrocarbons may be low-boiling hydrocarbons, for example, the hydrocarbons may be anyone of an isopentane, a n-octane, and an isooctane.

The Chinese name of the above AN/VDC is bingxijing-pianlvyixi (the unicodes of the characters are 00004E19, 000070EF, 00008148, 0000002D, 0000504F, 00006C2F, 00004E59, 000070EF), which can provide sealing performance and rigidity. The Chinese name of the above-mentioned MMA is jiajibingxisuanjiazhi (the unicodes of the characters are 00007532, 000057FA, 00004E19, 000070EF, 00009178, 00007532, 0000916F), the Chinese name of MA is bingxisuanjiazhi (the unicodes of the characters are 00004E19, 000070EF, 00009178, 00007532, 0000916F), and the Chinese name of MAN is jiajibingxijing (the unicodes of the characters are 00007532, 000057FA, 00004E19, 000070EF, 00008148); MMA, MA and MAN can all provide thermoplastic. The mixture of AN/VDC and MMA can be obtained after physical mixing AN/VDC and MMA; similarly, the mixture of AN/VDC and MA can be obtained after physical mixing AN/VDC and MA; the mixture of AN/VDC and MAN can be obtained after physical mixing AN/VDC and MAN.

The embodiment of the present disclosure further provides a manufacturing method of the dimming panel, in which the definition part is configured to be obtained after the expandable structure is thermally expanded and cured.

The method includes:

S20, forming a first dimming panel; wherein, referring to FIG. 7, the first dimming panel includes at least one dimming module; the dimming module includes a first substrate 11 and a second substrate 21 disposed oppositely, and a dimming layer 30 disposed between the first substrate 11 and the second substrate 21; the dimming module further includes a first alignment film and a second alignment film, the first alignment film is disposed at a side of the first substrate close to the dimming layer, and the second alignment film is disposed at a side of the second substrate close to the dimming layer. Referring to FIG. 7, the first alignment film includes a first alignment part 131, the second alignment film includes a second alignment part 231, the definition part is formed after the first alignment part and the second alignment part are both expanded by illumination, undergo cross-linking reaction and are cured. The expandable structure includes a first alignment part before illumination and a second alignment part before illumination.

The above first alignment part and the second alignment part may be produced by using the polyimide and the first coupling agent. In order to realize the selection of the arbitrary position of the first alignment part and the second alignment part, the above-mentioned first alignment film and the second alignment film may be produced by using the polyimide and the first coupling agent. In this way, any part of the first alignment film may be used as the first alignment part, and any part of the second alignment film may be used as the second alignment part, and the specific positions of the first alignment part and the second alignment part may be determined according to the product size and shape required by users.

S21, illuminating the first alignment part and the second alignment part, to make the first alignment part and the second alignment part thermally expanded and cured, to form the dimming panel with the definition part 32 as shown in FIG. 2.

By performing steps S20 and S21, a dimming panel with a definition part of any shape may be obtained, and the panel is subsequently cut along the definition part to obtain products with any shape and different sizes; at the same time, by mass-producing the first dimming panel in step S20, which can greatly improve the production efficiency and reduce the production costs.

The embodiment of the present disclosure further provides a manufacturing method of the dimming panel, in which the definition part is configured to be obtained after a deformable structure undergoes a cross-linking reaction after being heated or illuminated and is cured.

The method includes:

S30, forming a second dimming panel; wherein the second dimming panel includes at least one dimming module; the dimming module includes a first substrate and a second substrate disposed oppositely, and a dimming layer disposed between the first substrate and the second substrate; the dimming layer includes a liquid crystal and a second coupling agent.

S31, illuminating (e.g., UV illumination) or heating a designated region of the dimming layer, so that the structure in the designated region undergoes a cross-linking reaction and is cured, to form the above dimming panel with the definition part.

Any region of the above dimming layer may be used as the designated region and used as the deformable structure. The designated region may be determined according to the product size and shape required by the user. For example, if the user requires a circular dimming panel, the designated region may include a toroidal region. Then, heating or illuminating the toroidal region may form an annular definition part; after the dimming panel is subsequently cut along the definition part, the circular dimming panel required by the user can be obtained. Certainly, the designated region may also include regions with other shapes, which will not be listed one by one here.

By performing steps S30 and S31, a dimming panel with a definition part of any shape may be obtained, and the panel is subsequently cut along the definition part to obtain products with any shape and different sizes; at the same time, by mass-producing the second dimming panel in step S30, which can greatly improve the production efficiency and reduce the production costs.

The embodiment of the present disclosure further provides a manufacturing method of the dimming panel, in which the material of the definition part includes a frame sealant.

The method includes:

S40, forming a first substrate and a second substrate, wherein the first substrate or the second substrate is provided with a definition part, and the material of the definition part is the frame sealant.

The setting position of the above definition part may be determined according to the product size and shape required by the user. In order to further improve production efficiency, a plurality of definition parts may be set, and the dimming layer may be divided into dimming parts with various shapes and various sizes. After subsequent cutting along the definition part, panels with various shapes and various sizes may be obtained. Further, if the cut panels are spliced, panels with more shapes and more sizes may be obtained, thereby improving the utilization rate of the panels and further improving the production efficiency.

S41, forming a dimming layer on a substrate with the definition part. Due to the separation effect of the definition part, a plurality of dimming parts can be formed.

S42, ceiling the first substrate and the second substrate to form a dimming panel with the definition part.

By performing steps S40 to S42, the dimming panel with the definition part may be obtained; by mass-producing the dimming panel, which can improve the production efficiency to a certain extent and reduce the production costs.

The embodiment of the present disclosure further provides a manufacturing method of the dimming glass, and the dimming glass includes at least one cut dimming panel.

The method includes:

S10, cutting the dimming panel with the definition part along the region to be cut, to obtain at least one cut dimming panel.

In order to further protect the cut dimming panel, the waterproof glue (for example, frame sealant) may be coated on the outside of the definition part to prevent the introduction of water vapor from the edge after long-term use, and further ensure the quality of the product.

Optionally, after S10, cutting the above dimming panel along the region to be cut, to obtain at least one cut dimming panel, the above method further includes:

S11, splicing the cut dimming panels.

By splicing, products with more shapes and sizes may be further formed, thereby improving the utilization rate of the cut dimming panel and further improving the production efficiency.

The manufacturing process of the dimming glass is described below by taking the spherical expandable structure forming the definition part as an example.

Figure 13A:
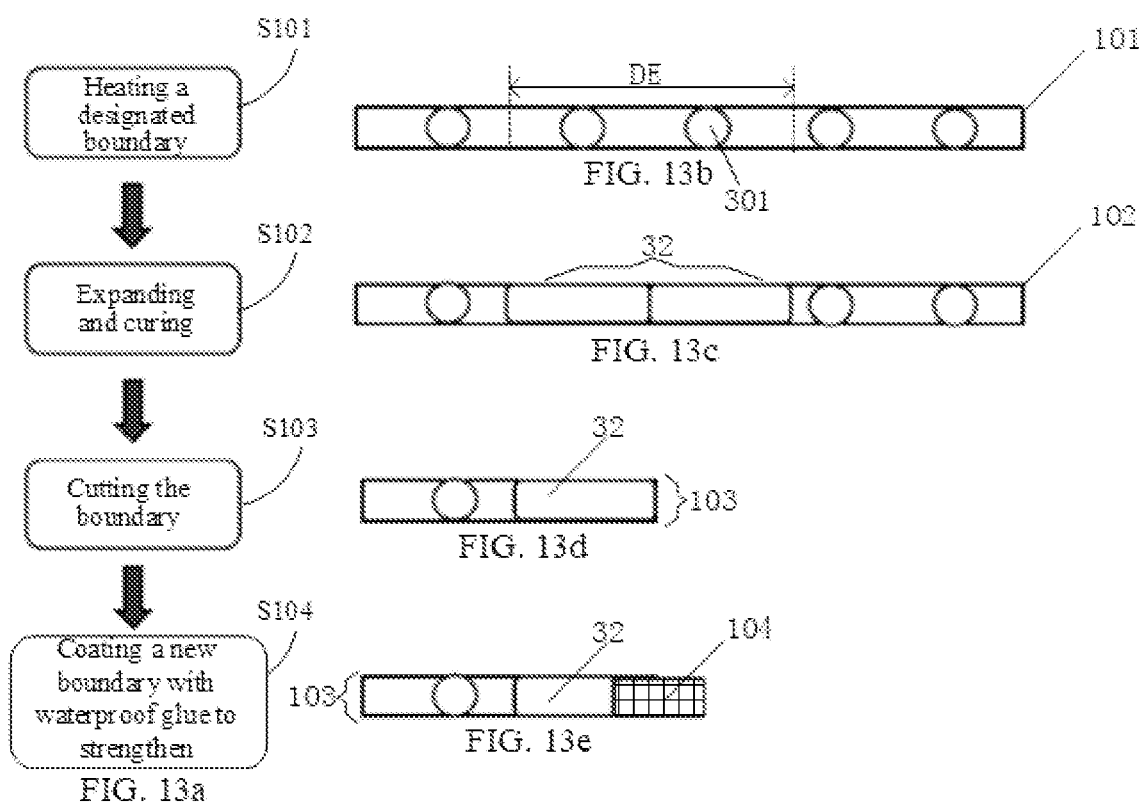
FIG. 13a schematically illustrates a manufacturing flow chart of a dimming panel, FIG. 13b schematically illustrates a structural schematic diagram of a dimming panel to be heated, FIG. 13c schematically illustrates a structural schematic diagram of a dimming panel obtained after executing step S102, FIG. 13d schematically illustrates a structural schematic diagram of a dimming panel obtained after executing step S103, FIG. 13e schematically illustrates a structural schematic diagram of a dimming panel obtained after executing step S104.

Referring to FIG. 13a, the manufacturing process includes:

S101, heating a designated region DE of a dimming panel 101 shown in FIG. 13b, the dimming panel 101 includes an expandable structure 301.

S102, curing the heated designated region DE of the dimming panel 101 shown in FIG. 13b, to obtain a dimming panel 102 shown in FIG. 13c, wherein the expandable structure expands after being heated, and forms a definition part 32 after being cured.

S103, cutting along the definition part 32, to obtain a dimming panel 103 shown in FIG. 13d.

S104, referring to FIG. 13e, coating a waterproof glue 104 on the outside of the definition part 32 of the dimming panel 103, to improve encapsulation effect.

The above manufacturing method is simple and easy to implement. As long as the dimming panel 101 shown in FIG. 13b is mass-produced, dimming panels with various sizes and shapes can be formed, thereby greatly improving production efficiency and reducing production costs.

Reference herein to "one embodiment," "an embodiment," or "one or more embodiments" means that a particular feature, structure, or characteristic described in connection with an embodiment is included in at least one embodiment of the present disclosure. Also, please note that instances of the phrase "in one embodiment" herein are not necessarily all referring to the same embodiment.

In the specification provided herein, numerous specific details are set forth. It will be understood, however, that the embodiments of the present disclosure may be practiced without these specific details. In some instances, well-known methods, structures, and techniques have not been shown in detail in order not to obscure an understanding of this specification.

Finally, it should be noted that the above embodiments are only used to illustrate the technical solutions of the present disclosure, but not to limit them; although the present disclosure has been described in detail with reference to the foregoing embodiments, those of ordinary skill in the art should understand that: they can still modify the technical solutions recorded in the foregoing embodiments, or they can equivalently replace some technical features thereof; and these modifications or replacements do not make the essence of the corresponding technical solutions deviate from the spirit and scope of the technical solutions of the embodiments of the present disclosure.

The invention claimed is:

1. A dimming panel, wherein the dimming panel comprises at least one dimming module; the at least one dimming module comprises a first substrate and a second substrate disposed oppositely, and a dimming layer disposed between the first substrate and the second substrate; and
   the dimming layer comprises a region to be cut and a dimming region connected to the region to be cut, the region to be cut comprises at least one definition part, the dimming region comprises a plurality of dimming parts, the at least one definition part is disposed between adjacent dimming parts, and configured to be capable of being cut to segment the adjacent dimming parts, and the plurality of dimming parts are configured to control transmittances of lights under an action of an electric field;
   the at least one definition part is configured to be obtained after deforming a deformable structure;
   the deformable structure comprises an expandable structure;
   wherein the expandable structure comprises an inner core layer and a cladding layer surrounding the inner core layer, a material of the inner core layer comprises a foaming agent, and a material of the cladding layer comprises a thermoplastic polymer; the at least one definition part is configured to be obtained after the expandable structure is thermally expanded and cured.

2. The dimming panel according to claim 1, wherein the foaming agent comprises hydrocarbons, and the thermoplastic polymer comprises anyone of: a mixture of AN/VDC and MMA, a mixture of AN/VDC and MA, a mixture of AN/VDC and MAN.

3. The dimming panel according to claim 1, wherein a shape of the expandable structure is a spherical shape.

4. The dimming panel according to claim 3, wherein a diameter range of the expandable structure is 4 µm-20 µm.

5. The dimming panel according to claim 1, wherein the plurality of dimming parts comprise a dye liquid crystal layer, and the expandable structure doped in the dye liquid crystal layer.

6. The dimming panel according to claim 5, wherein a diameter of the expandable structure is equal to a thickness of the dimming layer along a direction perpendicular to a plane where the first substrate is located.

7. The dimming panel according to claim 1, wherein the at least one dimming module further comprises a first alignment film and a second alignment film, the first alignment film is disposed at a side of the first substrate close to the dimming layer, and the second alignment film is disposed at a side of the second substrate close to the dimming layer;
   the first alignment film comprises an illuminated first alignment part, an orthographic projection of the illuminated first alignment part on the first substrate overlaps with an orthographic projection of the at least one definition part on the first substrate; the second alignment film comprises an illuminated second alignment part, an orthographic projection of the illuminated second alignment part on the second substrate overlaps with an orthographic projection of the at least one definition part on the second substrate; and
   the expandable structure comprises a first alignment part before illumination and a second alignment part before illumination; the at least one definition part is configured to be obtained after the first alignment part before illumination and the second alignment part before illumination are both expanded by illumination, undergo a cross-linking reaction and are cured.

8. The dimming panel according to claim 7, wherein the first alignment part before illumination and the second alignment part before illumination both comprise a polyimide and a first coupling agent.

9. The dimming panel according to claim 1, wherein a material of the at least one definition part comprises a frame sealant.

10. The dimming panel according to claim 1, wherein the region to be cut comprises a plurality of definition parts, the plurality of definition parts are configured to divide the dimming region into the plurality of dimming parts with different sizes.

11. A dimming glass, wherein the dimming glass comprises at least one cut dimming panel, the at least one cut dimming panel is configured to be obtained after cutting the dimming panel according to claim 1 along the region to be cut.

12. The dimming glass according to claim 11, wherein the dimming glass comprises a plurality of cut dimming panels, the plurality of cut dimming panels are spliced with each other.

13. A manufacturing method of the dimming glass according to claim 11, wherein the method comprises:
cutting the dimming panel along the region to be cut, to obtain the at least one cut dimming panel.

14. The method according to claim 13, wherein after cutting the dimming panel along the region to be cut, to obtain the at least one cut dimming panel, the method further comprises:
splicing the at least one cut dimming panel.

15. A manufacturing method of the dimming panel according to claim 1, wherein the method comprises:
forming a standard dimming panel; the standard dimming panel comprises the at least one dimming module; the at least one dimming module comprises the first substrate and the second substrate disposed oppositely, and the dimming layer disposed between the first substrate and the second substrate; the dimming layer comprises the expandable structure; the expandable structure comprises the inner core layer and the cladding layer surrounding the inner core layer, the material of the inner core layer comprises the foaming agent, and the material of the cladding layer comprises the thermoplastic polymer; and
heating a designated region of the dimming layer, to make the expandable structure located in the designated region thermally expanded and cured, to form the dimming panel according to claim 1.

16. The method according to claim 15, wherein the foaming agent comprises hydrocarbons, and the thermoplastic polymer comprises anyone of: a mixture of AN/VDC and MMA, a mixture of AN/VDC and MA, a mixture of AN/VDC and MAN.

17. A dimming panel, wherein the dimming panel comprises at least one dimming module; the at least one dimming module comprises a first substrate and a second substrate disposed oppositely, and a dimming layer disposed between the first substrate and the second substrate; and
the dimming layer comprises a region to be cut and a dimming region connected to the region to be cut, the region to be cut comprises at least one definition part, the dimming region comprises a plurality of dimming parts, the at least one definition part is disposed between adjacent dimming parts, and configured to be capable of being cut to segment the adjacent dimming parts, and the plurality of dimming parts are configured to control transmittances of lights under an action of an electric field;
the at least one definition part is configured to be obtained after deforming a deformable structure;
wherein a material of the deformable structure comprises a liquid crystal and a second coupling agent, and the at least one definition part is configured to be obtained after the deformable structure undergoes a cross-linking reaction by being heated or illuminated and is cured.

* * * * *